United States Patent [19]

Isono et al.

[11] 4,189,740
[45] Feb. 19, 1980

[54] COMMON CIRCUITRY VIR CONTROL APPARATUS FOR COLOR TELEVISION RECEIVER

[75] Inventors: Katsuo Isono, Kawagoe; Seiji Sanada, Yokosuka, both of Japan

[73] Assignee: Sony Corporation, Tokyo, Japan

[21] Appl. No.: 879,584

[22] Filed: Feb. 21, 1978

[30] Foreign Application Priority Data

Feb. 21, 1977 [JP] Japan .................................. 52/17915
Sep. 29, 1977 [JP] Japan .................................. 52/126884

[51] Int. Cl.$^2$ ............................................. H04N 9/535
[52] U.S. Cl. .................................................. 358/21 V
[58] Field of Search ..................... 358/27, 28, 10, 21 V

[56] References Cited

U.S. PATENT DOCUMENTS

| 3,950,780 | 4/1976 | Freestone | 358/28 |
| 4,101,927 | 7/1978 | Isono et al. | 358/27 |

Primary Examiner—Robert L. Griffin
Assistant Examiner—Aristotelis M. Psitos
Attorney, Agent, or Firm—Lewis H. Eslinger; Alvin Sinderbrand

[57] ABSTRACT

Color control apparatus for use in color video receiving apparatus of the type capable of receiving a color video signal which includes a VIR signal, the latter having at least a chrominance reference signal therein. A chrominance channel is provided for processing the chrominance component included in the color video signal. An extracting circuit connected to the chrominance channel separates burst and chrominance reference signals from the received color video signal. A predetermined parameter in the separated burst signal is detected, and a corresponding parameter in the chrominance reference signal is detected. A common amplifier is responsive to the detected parameters for producing an amplified control signal which, in turn, is supplied to an adjustable circuit so as to adjust a color characteristic of the processed chrominance component in accordance with the amplified control signal. The detected parameters may be the level of the respective burst and chrominance reference signals, which levels are detected by comparison with a reference level. The detected burst signal level thus is used in an automatic chrominance control circuit, and the detected chrominance reference signal level is used in a color saturation control circuit, both of these control circuits being connected with the common amplifier for controlling the color saturation level of a processed chrominance component. Also, the detected parameter may be the respective phases of the burst and chrominance reference signals with respect to a local oscillating signal used for demodulating the chrominance component. In that event, the detected burst signal phase and chrominance reference signal phase are used in automatic phase control and hue control circuits, respectively, both of these control circuits being connected to the common amplifier. In a preferred embodiment, the color control apparatus includes an ACC and a saturation control circuit connected to one common amplifier for controlling color saturation, and an APC circuit and a hue control circuit connected to another common amplifier for controlling the hue characteristic of the ultimately demodulated color signals.

59 Claims, 19 Drawing Figures

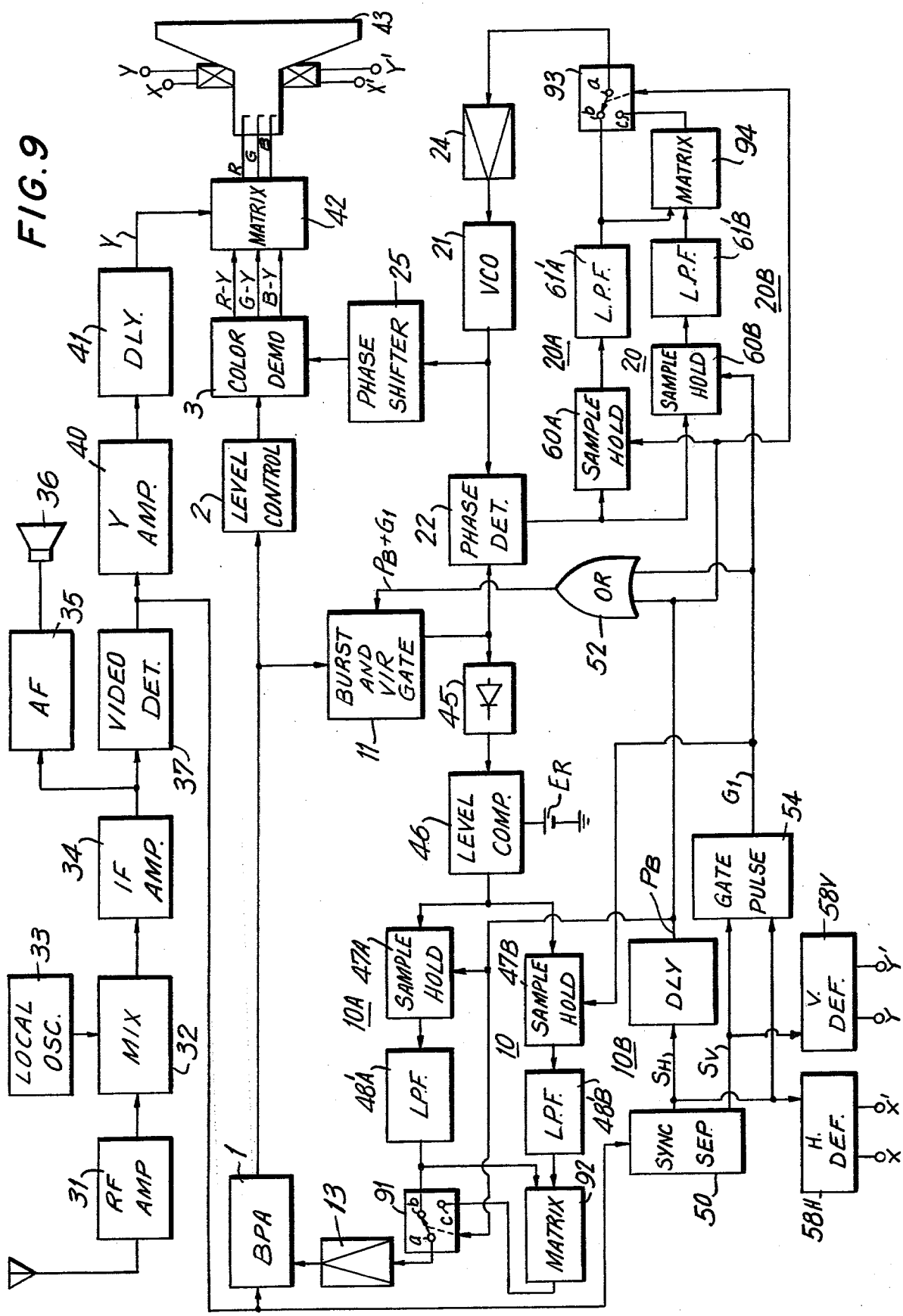

COMMON CIRCUITRY VIR CONTROL APPARATUS FOR COLOR TELEVISION RECEIVER

BACKGROUND OF THE INVENTION

This invention relates to color control apparatus for use in color video signal receiving apparatus and, more particularly, to such color control apparatus wherein many of the circuits normally provided for automatic chrominance (ACC) and/or automatic phase control (APC) also are used by VIR-responsive color saturation and/or hue control circuits.

A so-called vertical interval reference (VIR) signal is inserted into the nineteenth line interval of the vertical blanking interval in the color video signal which is broadcasted by many television broadcast stations. The purpose of this inserted VIR signal is to provide certain predetermined reference parameters, or characteristics, whereby video signal receiving apparatus, upon detecting these parameters or characteristics can effect an automatic color correction operation, whereby the ultimately reproduced color video picture exhibits proper color saturation and hue.

In the absence of a VIR signal, color saturation and hue characteristics of the reproduced video picture are controlled by the usual automatic chrominance control (ACC) and automatic phase (APC) circuits which are responsive to the level and phase, respectively, of the burst signal which is included in the received color video signal. Thus, the ACC circuit includes a gain-controlled amplifier for adjusting the level of the chrominance component included in the color video signal in accordance with the difference between the detected level of the burst signal and a predetermined reference level. Since the gain of the chrominance component determines the color saturation level, the ACC circuit functions to automatically control the color saturation characteristic. The APC circuit detects the phase differential between the burst signal and a locally generated oscillating signal which is used to demodulate the received chrominance component. This APC circuit functions to lock the phase of the local oscillating signal to the phase of the burst signal so as to properly establish the demodulating axis and automatically control the hue of the reproduced video picture. That is, it is assumed that the hue characteristic is correct when the phase of the local oscillating signal is locked to the phase of the burst signal.

While ACC and APC circuits generally are adequate in their respective operations, the level, or gain, of the chrominance component, as well as the phase of the chrominance subcarrier during the information portion of a horizontal line interval may differ from the corresponding gain and phase of the burst signal. Thus, ACC and APC circuits, by themselves, may not offer completely satisfactory results, especially with respect to the flesh tone colors of the reproduced video picture. For these reasons, the insertion of the VIR signal into the vertical blanking interval, and the use of color control circuits which are responsive to this VIR signal have been adopted.

The VIR signal which now is used in the industry is formed of a reference subcarrier, equal in frequency and phase to the usual burst signal, this reference subcarrier being superposed on a predetermined reference luminance level and being transmitted during a preselected chrominance reference portion of the VIR signal. This is designated herein as the chrominance reference signal. Following this chrominance reference signal, the VIR signal is provided with a luminance reference signal of predetermined amplitude and duration. A black reference signal of a respectively predetermined amplitude and duration then follows the luminance reference signal. As in the transmission of a normal line interval, the VIR signal also includes horizontal synchronizing pulses and a burst signal. When the VIR signal is received, the reference information provided by the chrominance reference signal, the luminance reference signal and the black reference signal is used to control the gain, or level, of the chrominance channel, thereby controlling the color saturation, and the phase of the locally generated oscillating signal used for demodulation, thereby controlling the hue characteristic.

In a typical VIR-controlled color correction circuit, the level of one of the demodulated color difference signals which is produced in response to the chrominance reference signal included in the VIR signal is detected. The level of this demodulated color difference signal should, of course, correspond to a predetermined level for proper color saturation chracteristics. Thus, any difference between the actual level and the predetermined level is used to vary the gain of the chrominance channel. Typically, a high gain amplifier is used for such gain adjustments. Similarly, the level of another demodulated color difference signal is detected during the time that the chrominance reference signal of the VIR signal is received. For correct hue characteristics, it is expected that this demodulated color difference signal will have a predetermined level. In the event that the actual level differs from the expected predetermined level, this difference is used to vary the phase of the local oscillating signal which is utilized for color demodulation. Typically, a high gain amplifier is relied upon for this phase control.

Typical of this type of VIR-controlled color correction is the apparatus disclosed in U.S. Pat. No. 3,950,780, issued Apr. 13, 1976. An improved VIR-controlled color correction circuit is disclosed in our copending application Ser. No. 839,847, filed Oct. 6, 1977. Yet another example of such VIR-controlled color correction circuitry is disclosed in our copending application Ser. No. 825,186, filed Aug. 16, 1977. In color video signal receiving apparatus which includes such circuitry, such as in a color television receiver or a video signal recorder/reproducer (for example a VTR device), it is necessary that the usual ACC and APC circuitry also be provided. Typically, the ACC circuit is separate and apart from the VIR-controlled color saturation control circuit; and the APC circuit likewise is separate and apart from the VIR-controlled hue correction circuit. By providing such independent circuits, there is a duplication in many circuit components which perform analogous functions but in different control circuits. Heretofore, individual high gain amplifiers have been provided in the ACC circuit, the VIR-controlled color saturation correction circuit, the APC circuit and the VIR-controlled hue correction circuit. Such high gain amplifiers are relatively expensive, and the respective circuits in which they are used are relatively complex, primarily because of redundancy. Consequently, the overall cost of production for such color video signal receiving apparatus is high.

OBJECTS OF THE INVENTION

Therefore, it is an object of the present invention to provide relatively simple and inexpensive color control apparatus for use in color video signal receiving apparatus.

Another object of this invention is to provide color control apparatus including ACC circuitry, APC circuitry, VIR-controlled saturation correction circuitry and VIR-controlled hue correction circuitry wherein common circuit components are used to perform similar functions in the respective circuits.

A further object of this invention is to provide a color control circuit formed of an ACC circuit and a VIR-controlled circuit utilizing a common high gain amplifier.

An additional object of this invention is to provide a color control circuit formed of an APC circuit and a VIR-controlled circuit using a common high gain amplifier.

A still further object of this invention is to provide color control apparatus for use in color video signal receiving apparatus which is of lower cost than prior art circuits and which avoids many of the problems attending such prior art circuits.

Various other objects, advantages and features of the present invention will become readily apparent from the ensuing detailed description, and the novel features will be particularly pointed out in the appended claims.

SUMMARY OF THE INVENTION

In accordance with this invention, color control apparatus for use in color video signal receiving apparatus of the type capable of receiving a color video signal which includes a VIR signal is provided. A chrominance channel processes the chrominance component included in the color video signal and is coupled to an extracting circuit which separates the burst signal and the chrominance reference signal included in the VIR signal from the color video signal. Detecting circuitry detects a predetermined parameter in the separated burst signal and a corresponding parameter in the separated chrominance reference signal. A common amplifier, connected to the detecting circuitry, responds to the detected parameters for producing an amplified control signal. An adjusting circuit responds to the amplified control signal for adjusting a color characteristic of the processed chrominance component. If the adjusted color characteristic is the color saturation, then the detecting circuitry functions to detect the respective levels of the separated burst and chrominance reference signals. Any differences between these levels and a predetermined reference level are used to adjust the color saturation characteristic. If the adjusted color characteristic is the hue, then the detected parameters are the respective phases of the burst and chrominance reference signals relative to the phase of a locally generated oscillating signal. Any phase differences are used to adjust the phase of the oscillating signal which is used in the chrominance channel for demodulating the chrominance component into respective color signals. In one embodiment, the color control apparatus includes both a variable gain amplifier for adjusting the color saturation of the chrominance component and a controllable oscillator for controlling the phase of the local oscillating signal, and thus the hue of the processed chrominance component.

BRIEF DESCRIPTION OF THE DRAWINGS

The following detailed description, given by way of example, will best be understood in conjunction with the accompanying drawings in which:

FIG. 9 is a block diagram of another embodiment of the color control apparatus in accordance with the present invention.

DETAILED DESCRIPTION OF SOME OF THE PREFERRED EMBODIMENTS

Figure 1:
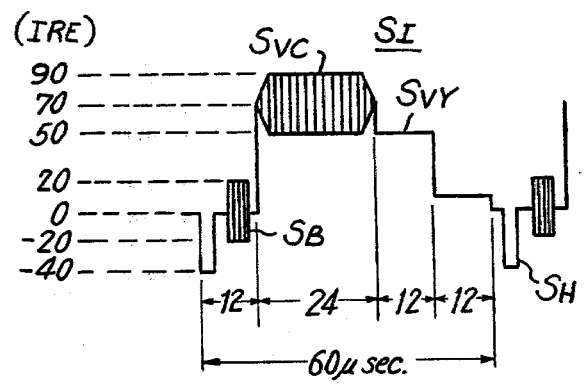
FIG. 1 represents the waveform of a typical VIR signal.

Before proceeding with a discussion of the present invention, reference is made to FIG. 1 which is a waveform representation of a typical VIR signal. As mentioned above, this VIR signal is transmitted during line 19 of the composite television signal. This line interval includes the normal blanking and horizontal synchronizing pulses as well as the color burst signal $S_B$. The levels of the different signal components shown in FIG. 1 are expressed in IRE units wherein the difference between the blanking level and zero level is one hundred units. The horizontal synchronizing pulse is shown as a negative pulse of forty units amplitude, and this pulse is followed by burst signal $S_B$ provided on the blanking or pedestal level of zero units. As is conventional, burst signal $S_B$ is sinusoidal having a frequency equal to the subcarrier frequency of 3.58 MHz. Typically, the burst signal is present for approximately eight cycles. The peak-to-peak amplitude of burst signal $S_B$ is forty units and its phase is coincident with the $-(B-Y)$ axis.

Approximately $12\mu$ seconds after the beginning of this VIR signal, the chrominance reference signal $S_{VC}$ is provided, this chrominance reference signal being formed of the unmodulated subcarrier frequency of 3.58 MHz which is of the same phase as the burst signal. The chrominance reference signal is superimposed onto a luminance level of seventy units and exits for a duration of approximately $24\mu$ seconds. Following this chrominance reference signal $S_{VC}$ is a luminance reference signal $S_{VY}$ whose amplitude is fifty units and whose duration is $12\mu$ seconds. The luminance reference signal $S_{VY}$ is followed by a black reference signal $S_{VB}$ having a level of 7.5 units and a duration of $12\mu$ seconds. The approximate duration from the start of the horizontal synchronizing pulse to the termination of the black reference signal is 60μ seconds.

Figure 2:
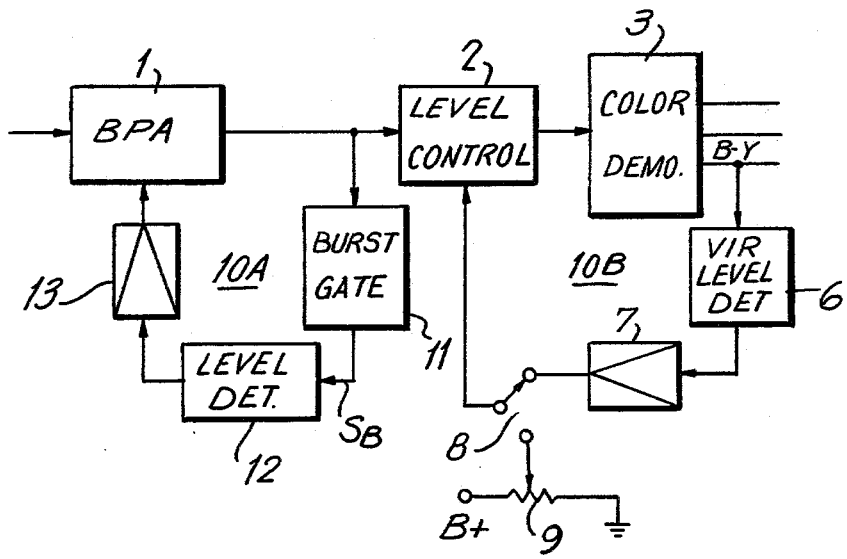
FIG. 2 is a block diagram of a previously proposed color control circuit for controlling color saturation.

One example of color control circuitry which has been proposed heretofore and which utilizes the VIR signal of FIG. 1 is shown in FIG. 2. This color control circuitry is adapted to control the color saturation level of the ultimately reproduced video picture. Although shown in conjunction with a color demodulator 3, this circuitry can be used in a color television receiver or, in the absence of color demodulator 3, in a video signal recorder/reproducer, such as a video tape recorder (VTR). Furthermore, the VIR-controlled circuitry, identified by reference numeral 10B, is shown in conjunction with a typical automatic chrominance control (ACC) circuit 10A. In general, both circuits are used because the ACC circuit provides a saturation control function during each horizontal line interval while the VIR-controlled circuit provides a saturation control function which is updated once during each frame interval. Furthermore, there is the possibility that the received color television signal does not include a VIR signal.

In the color control circuit shown in FIG. 2, a chrominance channel is provided, including a controllable band-pass amplifier 1, a level control circuit 2 and color demodulator 3. Band-pass amplifier 1 is adapted to separate the chrominance component from the received composite color television signal and to amplify this chrominance component for further processing. Level control circuit 2 typically includes a gain-controlled amplifier for providing a further gain controlling, or level adjusting, function to the separated chrominance component. As an alternative, level control circuit 2 may comprise an adjustable attenuator which, it is appreciated, also functions to adjust the gain of the chrominance component. Color demodulator 3 is a conventional color demodulating circuit which is responsive to a locally generated oscillating signal (not shown) to demodulate the received chrominance component into respective color difference signals, such as the blue (B-Y), green (G-Y) and red (R-Y) color difference signals at respective outputs.

VIR-controlled saturation correction circuit 10B includes a level detector 6 connected to receive the demodulated B-Y signal from color demodulator 3 and an amplifier 7 for connecting level detector 6 to level control circuit 2. In addition, a switch 8 is provided for selectively connecting either amplifier 7 or a manually adjustable circuit 9, shown herein as a potentiometer, to level control circuit 2. Switch 8 may be manually operable or, as is preferred, is controlled automatically in response to the detected presence or absence of a VIR signal to connect either amplifier 7 or potentiometer 9, respectively, to level control circuit 2.

ACC circuit 10A includes a closed loop connected between the output of band-pass amplifier 1 and a control input thereof. This closed loop includes a burst gate 11, a level detector 12 and an amplifier 13.

In operation, burst gate 11 is energized during each line interval to separate burst signal $S_B$ from the chrominance component. The separated burst signal is applied to level detector 12 whereat the level of the separated burst signal is detected. The level detector produces a control signal in accordance with the detected level of burst signal $S_B$. This control signal, after amplification by amplifier 13, is applied as a gain controlling signal to band-pass amplifier 1. Hence, if the level of burst signal $S_B$ varies from a desired level, such as due to transmission disturbances or other factors, this variation in the level of the burst signal is detected and used to correspondingly adjust the gain of the chrominance component. Consequently, the chrominance component theoretically is controlled to a substantially constant level.

When the VIR signal shown in FIG. 1 is received, the chrominance reference signal $S_{VC}$ therein should have a predetermined level. In particular, the peak-to-peak level of the chrominance reference signal is 40 units superimposed upon a luminance level of 70 units. When this chrominance reference signal is demodulated by demodulator 3, color difference signal B-Y should have a predetermined level. Level detector 6, which is energized for the duration of the chrominance reference signal during each VIR interval, detects whether the level of the B-Y signal is equal to its expected predetermined level. In the event of any difference therebetween, an adjustment signal is supplied to amplifier 7 whereat it is amplified and applied as a control signal to level control circuit 2. Hence, level detector 6, amplifier 7, level control circuit 2 and demodulator 3 function as a closed loop to correct the color saturation level in accordance with the information included in the received VIR signal. Potentiometer 9 is provided to enable an operator to adjust the color saturation level in accordance with his own particular preferences in the absence of a VIR signal.

Figure 3:
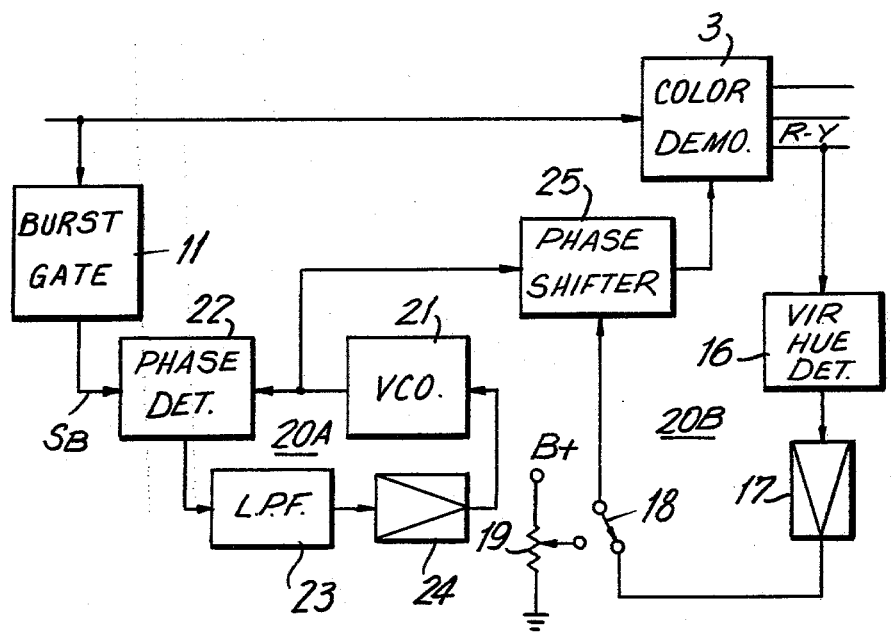
FIG. 3 is a block diagram of a previously proposed color control circuit for controlling hue.

The circuit shown in FIG. 2 is adapted to control the color saturation characteristic of the reproduced video picture. FIG. 3 represents the color control circuitry which normally is used to control the hue characteristic of the video picture. As is known, hue is determined by the phase of the locally generated oscillating signal which is used to demodulate the chrominance component to respective color signals. A shift in the phase of the local oscillating signal from a predetermined value results in a corresponding shift in the hue characteristic. In the color control circuitry shown in FIG. 3, the phase of the local oscillating signal is controlled by an automatic phase control (APC) circuit 20A and by a VIR-controlled circuit 20B. APC circuit 20A is formed of a loop comprised of a controllable oscillator, such as a voltage controlled oscillator (VCO) 21, a phase detector 22, a low-pass filter 23 and an amplifier 24. Oscillator 21 generates the local oscillating signal and is connected to phase detector 22. Another input of phase detector 22 is connected to burst gate 11 which, as described previously, separates burst signal $S_B$ from the composite color video signal. The output of phase detector 22 is connected to amplifier 24 via low-pass filter 23, and amplifier 24 is connected to oscillator 21 for controlling the phase of the generated local oscillating signal. The output of oscillator 21 is supplied to color demodulator 3 as a demodulating signal for the chrominance component.

It is recalled that the phase of the subcarrier included in the chrominance reference signal $S_{VC}$ of the VIR signal is equal to the phase of burst signal $S_B$. Hence, when the chrominance reference signal is demodulated, it is expected that the level of the demodulated red difference signal R-Y will be equal to zero. Any deviation in the demodulated R-Y signal is assumed to be attributed to an error in the phase of the local oscillating signal. Accordingly, VIR-controlled hue correction circuit 20B is adapted to correct the phase of the local oscillating signal in accordance with the detected level of the demodulated R-Y signal. This function is carried out by a hue detector 16 connected to color demodulator 3 for receiving the R-Y signal and a phase shifter 25 connected between the output of oscillator 21 and the input of demodulator 3 for supplying a phase-adjusted local oscillating signal to the demodulator. The output of hue detector 16 is connected to phase shifter 25 via an amplifier 17. In addition, a switch 18 is provided for selecting either the output of amplifier 17 or a manually-generated control signal derived from a potentiometer 19 to phase shifter 25. In this regard, switch 18 performs a function analogous to that performed by switch 8 (FIG. 2). Thus, switch 18 may be controlled either manually or, as is preferred, in response to the detection of the presence or absence of a VIR signal.

In operation, APC circuit 20A functions to lock the phase of the local oscillating signal to the phase of the received burst signal $S_B$ during each line interval. As mentioned above, it is possible that, during a line interval, the phase of the subcarrier upon which the color signals are modulated may differ from the phase of the burst signal because of various transmission disturbances or other factors. VIR-controlled hue correction circuit 20B is provided for correcting the phase of the local oscillating signal in the event that this occurs. Hue detector 16 detects whether the R-Y signal level differs from its desired zero level when the chrominance reference signal is received. In the event that the R-Y signal does not exhibit its proper zero level, hue detector 16 supplies a correction signal to amplifier 17 which, in turn, amplifies this correction signal to determine the phase shift imparted to the local oscillating signal by phase shifter 25. In this regard, the loop formed of color demodulator 3, hue detector 16, amplifier 17 and phase shifter 25 functions to control the phase of the local oscillating signal, and thus the hue characteristic of the reproduced video picture. In the event that a VIR signal is not received, switch 18 may be actuated so as to permit an operator to adjust the hue of the video picture in accordance with his own preferences, merely by adjusting potentiometer 19 so as to establish a corresponding phase shift in the local oscillating signal.

Thus, it is appreciated that the color control circuitry shown in FIGS. 2 and 3 serve to correct for level and phase distortions, respectively, which may be present in the chrominance component due to transmission disturbances or other factors. Such level and phase distortions imparted to the chrominance component also are imparted to the VIR signal, and VIR-controlled saturation correction circuit 10B and hue correction circuit 20B thus correct for these distortions. Generally, such saturation and hue distortions appear as noticeable distortions in the flesh tones of the reproduced video picture. Accordingly, the VIR-controlled color correction circuitry is adapted to provide color corrections generally centered about an average flesh tone.

ACC circuit 10A and VIR-controlled color saturation correction circuit 10B include amplifiers 13 and 7, respectively, these amplifiers preferably being high gain amplifiers in order to provide high loop gains. Such amplifiers are relatively expensive. Furthermore, in circuits 10A and 10B, these amplifiers perform substantially similar functions. Similarly, in APC circuit 20A and VIR-controlled hue correction 20B, amplifiers 24 and 17, respectively, are provided. Here too, these amplifiers are high gain amplifiers and perform substantially similar functions. It is desirable to minimize costs and circuit complexity by providing a single, common amplifier for both the ACC and VIR-controlled color saturation correction circuit, and a single, common amplifier for both the APC and VIR-controlled hue correction circuit. This desirable objective is attained by the present invention.

Figure 5:
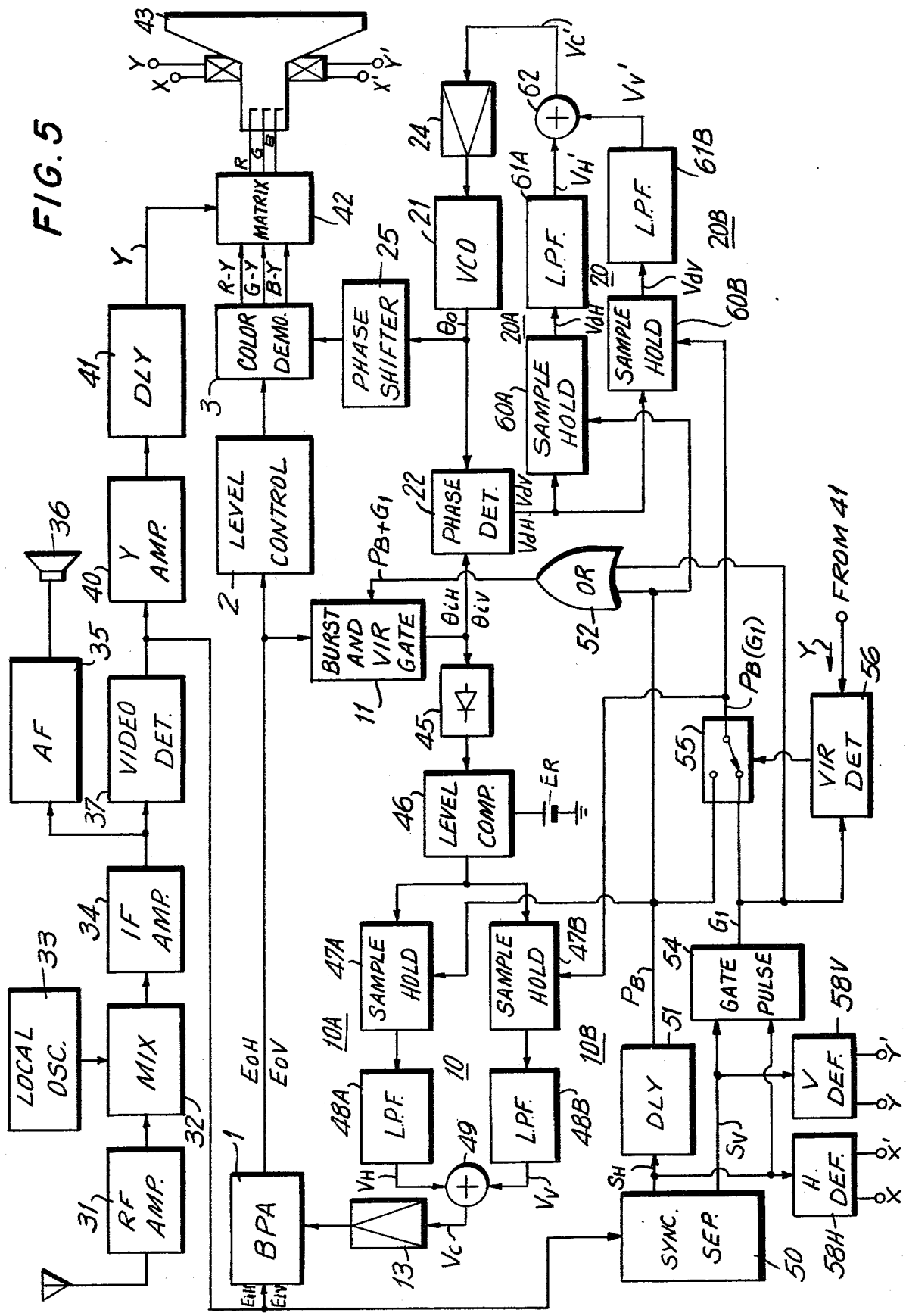
FIG. 5 is a block diagram of one embodiment of the color control apparatus in accordance with the present invention.

Referring now to FIG. 5, one embodiment of color video signal receiving apparatus which includes improved color control apparatus is shown. This apparatus includes a high frequency section including a ratio frequency (RF) amplifier 31, a mixer 32 and an intermediate frequency (IF) amplifier 34, a luminance component channel including an amplifier 40 and a delay circuit 41, a chrominance component channel including a band-pass amplifier 1, a level control circuit 2 and a color demodulator 3, and a color correction circuit including a level control circuit 10 and a phase control circuit 20. The high frequency section of the video signal receiving apparatus is conventional. Accordingly, RF amplifier 31 amplifies the received composite color video signal which is modulated on a transmission carrier. Mixer 32 is supplied with the amplified, received signal and also is supplied with a demodulating signal by local oscillator 33 so as to produce the IF video signal. This IF video signal is amplified by IF amplifier 34 and, as is usual, the audio portion of the television information is derived from the amplified IF signal and demodulated in an audio frequency section 35 for sound reproduction by a loudspeaker 36. In addition, the amplified IF video signal is supplied to a conventional video detector 37, the resultant detected video signal then being transmitted through the luminance and chrominance channels.

Luminance amplifier 40, which may have a bandwidth confined to the frequency band of the luminance component, is coupled to video detector 37 and is adapted to amplify the luminance component. A delay circuit 41 serves to impart a delay to the luminance component Y so as to equalize the phase of the luminance component with respect to the demodulated color signals, described below. This phase equalization may be needed because the time delay inherent in the chrominance processing channel is larger than the time delay associated with the luminance processing channel. The equalized luminance component Y is supplied to a matrix circuit 42 which is adapted to produce primary color drive signals R, G and B for modulating the respective beam intensities of a color cathode ray tube 43.

The output of video detector 37 additionally is coupled to band-pass amplifier 1. The output of band-pass amplifier 1 includes substantially only the chrominance component, as mentioned above, together with the burst signal $S_B$ which is superimposed onto the front porch of the horizontal blanking interval. In addition to being coupled to band-pass amplifier 1, video detector 37 is coupled to a synchronizing separator circuit 50, the latter including conventional circuitry for recovering horizontal synchronizing signals $S_H$ and vertical synchronizing signals $S_V$ from the received composite color video signal. The horizontal and vertical synchronizing signals are applied to horizontal and vertical deflection circuits 58H and 58V, respectively, for producing horizontal deflection drive signals at outputs X, X' and vertical deflection drive signals at outputs Y, Y', respectively. These deflection drive signals are applied to a suitable deflection yoke assembly at the neck of cathode ray tube 43, as is conventional.

Horizontal synchronizing signals $S_H$, separated by synchronizing separator circuit 50, are supplied through a delay circuit 51 to an OR circuit 52 for application to a gate circuit 11. As will be described below, gate circuit 11 is adapted to separate both burst signals $S_B$ and the chrominance reference signal $S_{VC}$ included in a VIR signal. Thus, when gate 11 is energized by the delayed horizontal synchronizing signal $S_H(P_B)$, which is coincident with burst signal $S_B$, the received burst signal passes through the gate signal to level control circuit 10. Also, this separated burst signal is supplied to phase control circuit 20. The level and phase control circuits 10 will be described in greater detail below.

Figure 4A:
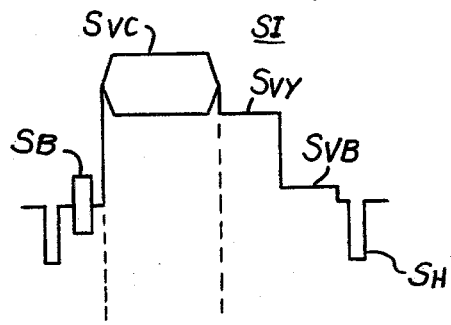
FIGS. 4A and 4B are waveform diagrams which are useful in explaining the operation of the present invention.
Figure 4B:
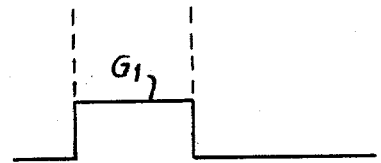

The separated horizontal synchronizing signal $S_H$ and the separated vertical synchronizing signal $S_V$ are supplied by synchronizing separator circuit 50 to a gate pulse generator 54. The gate pulse generator may include conventional counting and gating circuits such that, when vertical synchronizing signal $S_V$ is detected thereby, the counting circuits are activated to count successive horizontal synchronizing pulses $S_H$ so as to determine when the nineteenth horizontal synchronizing pulse has been generated. This identifies the nineteenth horizontal line interval. Multivibrator circuits also may be included in gate pulse generator 54 to be energized once the nineteenth horizontal line interval is identified, thereby producing gate pulses $G_1$ which coincide with the chrominance reference signal $S_{VC}$. This is represented by the waveform diagrams shown in FIGS. 4A and 4B, whereby gate pulse $G_1$ is coincident with the chrominance reference signal $S_{VC}$. These gate pulses $G_1$ are supplied to OR gate 52 for selectively actuating, or opening, gate 11. In addition, gate pulses $G_1$ are applied to a VIR detector 56 which functions to determine whether the received composite color video signal includes a VIR signal. This determination is made upon the basis of the luminance component Y which is produced during the interval that the chrominance reference signal is received. Hence, luminance component Y is supplied to VIR detector 56 from delay circuit 51, and gate pulse $G_1$ is used to sample the level of the luminance component.

Level control circuit 10 is comprised of a rectifier 45, a level comparator 46 and circuit branches 10A and 10B. Circuit branches 10A and 10B are connected in common to the output of level comparator 46, and the outputs of these circuit branches are connected to a common amplifier 13 which, preferably, is a high gain amplifier. The output of amplifier 13 is connected to a control input of band-pass amplifier 1. When gate 11, rectifier 45, level comparator 46, circuit branch 10A and amplifier 13 are considered, these circuit components form an ACC circuit. When gate 11, rectifier 45, level comparator 46, circuit branch 10B and amplifier 13 are considered, these circuit components form a VIR-controlled saturation correction circuit.

Circuit branch 10A includes a sample-and-hold circuit 47A connected in series with a low-pass filter 48A. The output of level comparator 46 is supplied to sample-and-hold circuit 47A, and the amplitude of this level comparator output is sampled by a burst gate pulse $P_B$ supplied to the sample-and-hold circuit by delay circuit 51. Similarly, circuit branch 10B comprises a sample-and-hold circuit 47B which is connected to receive the output of level comparator 46 and a low-pass filter 48B which is connected to the output of the sample-and-hold circuit. In the event that the received composite color video signal includes a VIR signal, sample-and-hold circuit 47B samples the amplitude of the level comparator output during the interval that the chrominance reference signal $S_{VC}$ is received. Accordingly, VIR gate pulses $G_1$ (FIG. 4B) are supplied to sample-and-hold circuit 47B via a switching circuit 55. In the event that the received color video signal does not include a VIR signal, it is preferred that sample-and-hold circuit 47B function to sample the output of level comparator 46 corresponding to the level of the received burst signal. To this effect, burst gate pulses $P_B$ are supplied to sample-and-hold circuit 47B via switching circuit 55. The state of this switching circuit determines whether burst gate signals $P_B$ or VIR gate signals $G_1$ are supplied to sample-and-hold circuit 47B. The state of this switching circuit is controlled by VIR detector 56 such that switching circuit 55 couples VIR gate pulses $G_1$ to the sample-and-hold circuit in the event that VIR detector 56 detects the presence of a VIR signal; and switching circuit 55 is switched to the state whereby burst gate signals $P_B$ are coupled to the sample-and-hold circuit in the event that the VIR detector detects the absence of a VIR signal.

The outputs of low-pass filters 48A and 48B produce respective control signal components $V_H$, corresponding to the burst-derived level control signal, and $V_V$, corresponding to the VIR-derived level control signal. These components $V_H$ and $V_V$ are combined by an adding circuit 49 to produce a summed level control signal $V_C$. This level control signal is amplified by amplifier 13 and supplied as an amplifier control signal to band-pass amplifier 1. Hence, the level of the chrominance component which is amplified by band-pass amplifier 1 is controlled in response to the level control signal $V_C$.

Phase control circuit 20 is comprised of a voltage controlled oscillator (VCO) 21, a phase detector 22, branch circuits 20A and 20B and an amplifier 24. Oscillator 21 may be a conventional, controllable oscillator responsive to a control signal for varying the phase of the local oscillating signal generated thereby. Phase detector 22 includes one input coupled to oscillator 21 and another input coupled to the output of gate circuit 11. Thus, phase detector 22 is adapted to produce phase error signals representing the phase difference between a burst signal separated by gate 11 and the local oscillating signal, and between a chrominance reference signal separated by gate 11 and the local oscillating signal. The ouput of phase detector 22 is connected in common to branch circuits 20A and 20B.

Branch circuit 20A is similar to aforedescribed branch circuit 10A and includes a sample-and-hold circuit 60A and a lowpass filter 61A connected in series. Sample-and-hold circuit 60A is supplied with burst gate signals $P_B$ from delay circuit 51 and is adapted to sample the level of the output from phase detector 22 in response thereto. Likewise, branch circuit 20B is similar to aforedescribed branch circuit 10B and includes sample-and-hold circuit 60B connected in series with low-pass filter 61B. Sample-and-hold circuit 60B is supplied with VIR gate signals $G_1$ or burst gate signals $P_B$ from switching circuit 55 for sampling the level of the output from phase detector 22.

Branch circuit 20A produces a burst-derived phase control component $V'_H$ and branch circuit 20B produces a VIR-derived phase control component $V'_V$. These respective phase control components are combined in an adding circuit 62 and supplied as a phase control signal $V'_C$ to amplifier 24. This amplifier functions to amplify the phase control signal $V'_C$ and apply same to oscillator 21 as a control signal therefor. Hence, the phase of the oscillating signal generated by oscillator 21 is controlled as a function of the phase control signal $V'_C$ and is supplied via a phase shifter 25 to demodulator 3 as a demodulating signal therefor.

The operation of the apparatus shown in FIG. 5 now will be described, in conjunction with the waveform diagrams shown in FIGS. 6A–6G, the filter characteristics shown in FIG. 7 and the waveform diagrams shown in FIGS. 8A–8C. Let it be assumed that the received composite color video signal includes a VIR signal. Thus, the level of luminance component Y during the interval that the chrominance reference signal $S_{VC}$ is received will exceed a predetermined threshold. VIR detector 56 samples the luminance component Y with the VIR gate pulse $G_1$ for detecting the level of the luminance component during this interval. The detected luminance component level then is compared to a threshold level to produce a switch control signal in accordance with the detected presence or absence of the VIR signal. In the present example, it is assumed that a VIR signal is present and the switch control signal produced by VIR detector 56 conditions switch 55 to the state whereby VIR gate pulses $G_1$ are coupled to sample-and-hold circuits 47B and 60B.

Figure 6A:
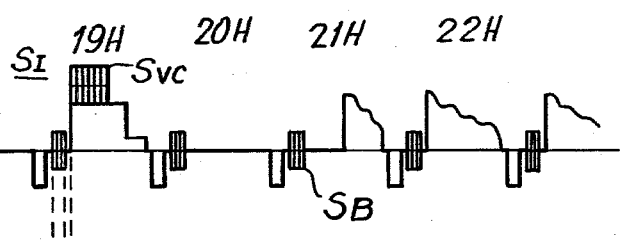
FIGS. 6A–6G are waveform diagrams which are useful in understanding the operation of the embodiment shown in FIG. 5.
Figure 6B:
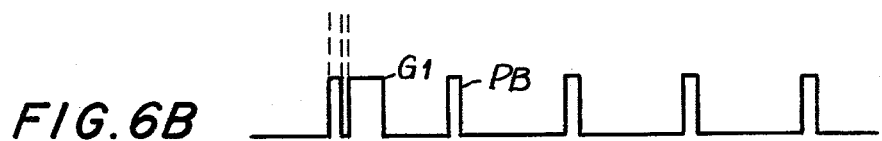
Figure 6C:
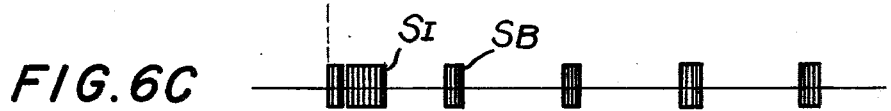
Figure 6D:
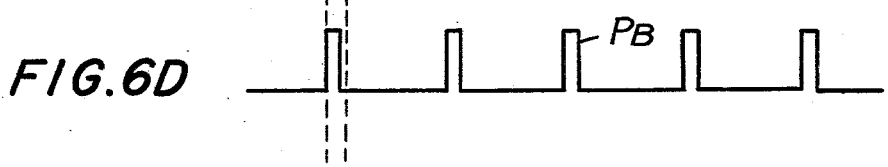

Burst gate pulse $P_B$ (FIG. 6B) is supplied to gate circuit 11 via OR circuit 52 to enable, or open, this gate circuit at the time that a burst signal $S_B$ (FIG. 6A) is present. Hence, this burst signal is separated from the chrominance component and is rectified and supplied to level comparator 46 as shown in FIG. 6C. The separated burst signal also is supplied to phase detector 22. In the level comparator, the level of the burst signal is compared to a predetermined reference level $E_R$. The difference, if any, between the burst signal and reference level $E_R$ is supplied in common to sample-and-hold circuits 47A and 47B. However, at this time, only sample-and-hold circuit 47A is activated by the burst gate signals $P_B$ (FIG. 6D). Hence, sample-and-hold circuit 47A samples and stores a representation of the level of burst signal $S_B$. This representation, after filtering by low-pass filter 48A, is supplied as a burst-derived level control component $V_H$ to one input of adding circuit 49.

Figure 6E:
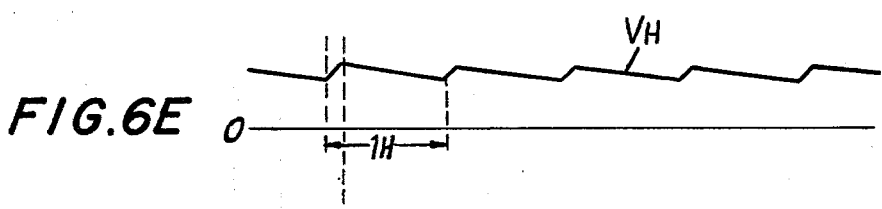
Figure 6F:
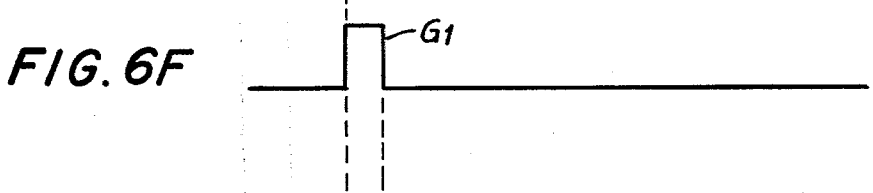
Figure 6G:
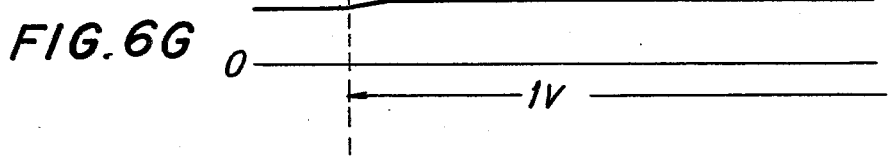

Upon the termination of burst gate signal $P_B$, gate 11 is deactivated, or closed. Then, when VIR gate signal $G_1$ (FIG. 6B) is produced, gate 11 again is opened so as to enable chrominance reference signal $S_{VC}$ (FIG. 6A) to pass therethrough to level comparator 46. The level comparator again functions to compare the signal supplied thereto to reference level $E_R$. Any difference, if any, therebetween, is supplied in common to sample-and-hold circuits 47A and 47B, as represented by signal $S_I$ in FIG. 6C. At this time, VIR gate signal $G_1$ (FIG. 6F) activates only sample-and-hold circuit 47B. Hence, this sample-and-hold circuit stores a representation of the level of the chrominance reference signal which, after filtering by low-pass filter 48B, is supplied to another input of adding circuit 49 as the VIR-derived level control component $V_V$. FIG. 6E represents the variations in the output of sample-and-hold circuit 47A, and thus the variations in the burstderived level control component $V_H$ over a number of line intervals; and FIG. 6G shows the manner in which the output of sample-and-hold circuit 47B varies, and thus the manner in which the VIR-derived level control component $V_V$ varies over a number of line intervals. The resultant level control signal $V_C$ produced by adding circuit 49 is amplified by amplifier 13 and supplied as a gain control signal to band-pass amplifier 1.

Phase detector 22 functions in a manner which is analogous to that of level comparator 46. Thus, when burst gate signals $P_B$ (FIG. 6B) are generated, the phase of burst signal $S_B$ (FIG. 6A) is compared to the phase of the local oscillating signal generated by oscillator 21. Any phase difference, if any, is supplied in common to sample-and-hold circuits 60A and 60B. Since burst gate signals $P_B$ (FIG. 6D) are present, only sample-and-hold circuit 60A is activated to sample and store the aforementioned detected phase difference. This phase difference signal $V_{dh}$ is filtered by low-pass filter 61A and supplied as a burst-derived phase control component $V'_H$ to one input of adding circuit 62.

At the termination of burst gate signal $P_B$, gate 11 closes. When VIR gate signal $G_1$ (FIG. 6B) is produced, gate 11 again opens to transmit chrominance reference signal $S_{VC}$ (FIG. 6A) to phase detector 22. Hence, the phase of the chrominance reference signal is compared to the phase of the local oscillating signal generated by oscillator 21. Any phase difference, if any, is represented as a signal $V_{dV}$ and is supplied in common to sample-and-hold circuits 60A and 60B. At this time, VIR gate signal $G_1$ activates sample-and-hold circuit 60B to sample and store the detected phase difference $V_{dV}$. This phase difference signal, after filtering by low-pass filter 61B, is supplied as VIR-derived phase control component $V'_V$ to another input of adding circuit 62. The respective phase control components are summed to produce phase control signal $V'_C$ which is amplified and used as a control signal for oscillator 21. The phase-controlled local oscillating signal then is applied to demodulator 3 via phase shifter 25. The manner in which the respective phase control components vary over a number of line intervals is shown in FIGS. 6E and 6G.

If desired, level control circuit 2 and phase shifter 25 shown in FIG. 5 may be provided with manual adjustments so as to permit an operator to control the color saturation characteristic and hue characteristic of the reproduced video picture in accordance with his preference.

In the event that the received composite color video signal does not include a VIR signal, then VIR detector 56 detects the absence of a VIR signal so as to condition switching circuit 55 to couple burst gate signals $P_B$ to sample-and-hold circuits 47B and 60B. Hence, these sample-and-hold circuits operate as substantial duplicates of sample-and-hold circuits 47A and 60A, respectively, whereby level control signal $V_C$ is formed by the addition of two burst-derived level control components and phase control signal $V'_C$ is formed by the addition of two burst-derived phase control components. That is, level control circuit 10 functions merely as a conventional ACC circuit, and phase control circuit 20 functions merely as a conventional APC circuit. The VIR-controlled branches 10B and 20B do not deleteriously affect this ACC and APC operation in the absence of a VIR signal.

As will now be described, branch circuits 10A and 10B operate substantially in parallel on the level-detected burst and chrominance reference signals, and branch circuits 20A and 20B also operate substantially in parallel on the phase-detected burst and chrominance reference signals. Let it be assumed that the level of the burst signal which is supplied to band-pass amplifier 1 by video detector 37 is represented as $E_{iH}$, and the level of the chrominance reference signal included in the VIR signal which is supplied to band-pass amplifier 1 is represented as $E_{iV}$. These input signals are suitably amplified by band-pass amplifier 1 to produce amplified versions of the burst and chrominance reference signals, which amplified versions are represented as $E_{oH}$ and $E_{oV}$, respectively. Let the gain control voltage which is used for determining the gain of the band-pass amplifier be represented as $V_c$, and the gain of amplifier 13 be equal to M. Hence, the gain G of band-pass amplifier 1 is represented as $G = -MV_c$.

The transfer function of low-pass filter 48A is expressed as $F_H(s)$; and the transfer function of low-pass filter 48B is expressed as $F_V(s)$. These transfer functions are represented mathematically as follows:

$$F_H(s) = \frac{\mu_{oH}}{s\tau_H + 1} \quad (1)$$

$$F_V(s) = \frac{\mu_{oV}}{s\tau_V + 1} \quad (2)$$

where $\mu_{oH}$ and $\mu_{oV}$ are the gains of low-pass filters 48A and 48B, respectively, $\tau_H$ and $\tau_V$ are constants and s is the Laplace operator. The transfer characteristics $F_H(s)$ and $F_V(s)$ are graphically depicted in FIG. 7 wherein the abscissa is the frequency axis and the ordinate is the gain axis. As may be appreciated, the gain characteristic $\mu$ may be less than unity (but positive) so as to provide attenuation for the signals which pass through the respective low-pass filter. Alternatively, if the low-pass filter is provided with an amplifier, the gain $\mu$ may be greater than unity. For the purpose of the present discussion, the term "gain" as used with respect to the low-pass filters is intended to refer either to attenuation or to amplification wherein $\mu$ is positive and may be greater or less than unity.

Figure 7:
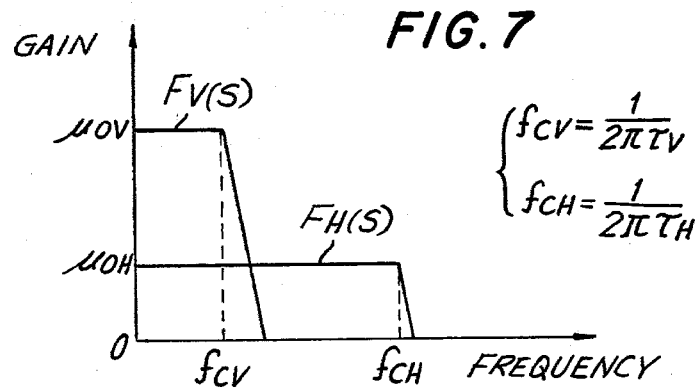
FIG. 7 is a graphical representation of the filtering characteristics of the low pass filters used in the embodiment shown in FIG. 5.
Figure 8A:
FIGS. 8A–8C are waveform diagrams which are helpful in understanding the operation of the embodiment shown in FIG. 5.
Figure 8B:
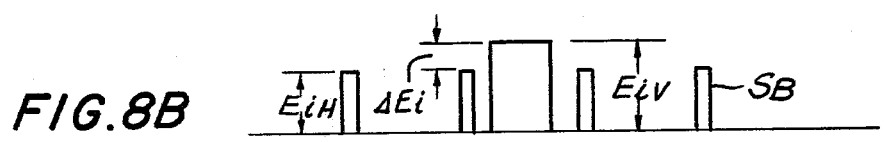
Figure 8C:
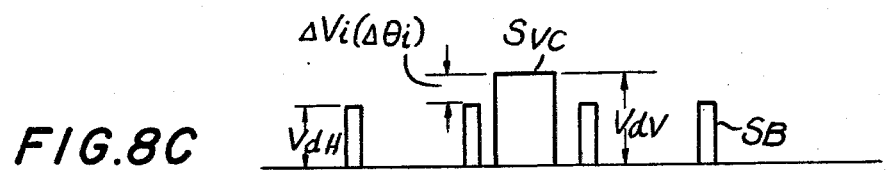

As also shown in FIG. 7, low-pass filter 48A has a cutoff frequency $f_{cH}$ which is much greater than the cut-off frequency $f_{cV}$ of low-pass filter 48B, and the gain of low-pass filter 48A is much less than the gain of low-pass filter 48B. Consequently, when level control circuit 10 achieves a correct color level characteristic in the ultimately reproduced video picture, the Laplace operator s is equal to zero and the transfer functions of the respective low-pass filters may be expressed:

$$F_H(0) = \mu_{oH} \ll \mu_{oV} = F_V(0) \quad (3)$$

The respective cut-off frequencies $f_{cH}$ of low-pass filter 48A and $f_{cV}$ of low-pass filter 48B are less than the usual horizontal synchronizing frequency $f_H$ and vertical synchronizing frequency $f_V$, respectively. Hence, these cut-off frequencies may be expressed as:

$$f_{cV} < f_V (= \alpha Hz) < f_{cH} < f_H (= 15.75 \text{ KHz}) \quad (4)$$

where $f_{cV} = 1/2\pi\tau_V$ and $f_{cH} = 1/2\pi\tau_H$

Since the gain of band-pass amplifier 1 is equal to $-MV_c$, the burst signal component $E_{oH}$ and the chrominance reference signal component $E_{oV}$ provided at the output of band-pass amplifier 1 may be expressed as:

$$E_{oH} = -MV_c E_{iH} \quad (5)$$

$$E_{oV} = -MV_c E_{iV} \quad (6)$$

Gate circuit 11 is, of course, responsive to burst gate pulse $P_B$ to transmit burst signal level $E_{oH}$ to level comparator 46. The output of this level comparator is proportional to the difference between the burst signal level $E_{oH}$ and reference level $E_R$. This difference signal is sampled by sample-and-hold circuit 47A in response to burst gate signal $P_B$, and then is filtered by lowpass filter 48A to produce the burst-derived level control component $V_H$ which may be expressed as:

$$V_H = F_H(s)(E_{oH} - E_R) \quad (7)$$

Similarly, the chrominance reference signal level $E_{oV}$ is transmitted through gate 11 in response to the VIR gate signal $G_1$ to level comparator 46 whereat this chrominance reference signal level is compared to reference level $E_R$. The difference between these levels is sampled by sample-and-hold circuit 47B in response to the VIR gate signal $G_1$; and the sampled signal is transmitted through low-pass filter 48B to produce VIR-derived level control component $V_V$, which may be expressed as:

$$V_V = F_V(s)(E_{oV} - E_R) \quad (8)$$

Summing circuit 49 adds components $V_H$ and $V_V$ to produce level control signal $V_C$ as follows:

$$V_C = V_H + V_V = F_H(s)E_{oH} + F_V(s)E_{oV} - [F_H(s) + F_V(s)]E_R \quad (9)$$

When equations (5) and (6) are substituted into equation (9), the level control signal $V_C$ may be rewritten as:

$$V_C = \frac{E_R[F_H(s) + F_V(s)]}{1 + M[F_H(s)E_{iH} + F_V(s)E_{iV}]} \quad (10)$$

Now, if equation (10) is substituted into equations (5) and (6), respectively, the burst and chrominance reference signal levels $E_{oH}$ and $E_{oV}$, respectively, are obtained as:

$$E_{oH} = \frac{ME_R[F_H(s) + F_V(s)]}{1 + M[F_H(s)E_{iH} + F_V(s)E_{iV}]} E_{iH} \quad (11)$$

$$E_{oV} = \frac{ME_R[F_H(s) + F_V(s)]}{1 + M[F_H(s)E_{iH} + F_V(s)E_{iV}]} E_{iV} \quad (12)$$

It is expected that the input burst signal level $E_{iH}$ applied to band-pass amplifier 1 is not essentially equal to the input chrominance reference signal level $E_{iV}$. This is represented by the waveform shown in FIG. 8B wherein it is assumed that the chrominance reference signal level $E_{iV}$ exceeds the burst signal level $E_{iH}$ by amount $\Delta E_i$. This is expressed as follows:

$$E_{iV} = E_{iH} + \Delta E_i \quad (13)$$

If equation (13) is substituted into equations (11) and (12), respectively, the expressions for $E_{oH}$ and $E_{oV}$ may be expressed as:

$$E_{oH} = \frac{ME_R[F_H(s) + F_V(s)]}{1 + M[\{F_H(s) + F_V(s)\}E_{iH} + F_V(s)\Delta E_i]} E_{iH} \quad (14)$$

$$E_{oV} = \frac{ME_R[F_H(s) + F_V(s)]}{1 + M[\{F_H(s) + F_V(s)\}E_{iH} + F_V(s)\Delta E_i]} (E_{iH} + \Delta E_i) \quad (15)$$

Desirably, the loop gain of level control circuit 10, that is, the loop gain for the ACC branch 10A and the VIRcontrol branch 10B is very high. This provides proper stability. Consequently, the loop gain is much greater than unity, and may be expressed as:

$$M[F_H(s)+F_V(s)]\gg 1 \tag{16}$$

Thus, the amount "1" may be neglected in the denominator in each of equations (14) and (15), and these equations may be simplified, in accordance with the inequality expressed by equation (16) as follows:

$$E_{oH} \approx \frac{E_R}{1 + \frac{F_V(s)}{F_H(s) + F_V(s)} \left(\frac{\Delta E_i}{E_{iH}}\right)} \tag{17}$$

$$E_{oV} \approx \frac{E_R}{1 + \frac{F_V(s)}{F_H(s) + F_V(s)} \left(\frac{\Delta E_i}{E_{iH}}\right)} \left(1 + \frac{\Delta E_i}{E_{iH}}\right)$$

$$= E_{oH} + \frac{E_R}{1 + \frac{F_V(s)}{F_H(s) + F_V(s)} \left(\frac{\Delta E_i}{E_{iH}}\right)} \left[\left(\frac{\Delta E_i}{E_{iH}}\right)\right] \tag{18}$$

Now, when proper level control is achieved, the output burst signal level will be equal to $E_{oH}(0)$ and the output chrominance reference signal level will be equal to $E_{oV}(0)$. Taking equation (3) into consideration, the proper, or level-corrected burst and chrominance reference signal levels may be represented as:

$$E_{oH}(0) \approx \frac{E_R}{1 + \frac{F_V(0)}{F_H(0) + F_V(0)} \left(\frac{\Delta E_i}{E_{iH}}\right)}$$

$$\approx \frac{E_R}{1 + \frac{\Delta E_i}{E_{iH}}} = \frac{E_{iH} E_R}{E_{iH} + \Delta E_i} = \frac{E_{iH}}{E_{iV}} E_R \tag{19}$$

$$E_{oV}(0) = \frac{E_R}{1 + \frac{\Delta E_i}{E_{iH}}} \left(1 + \frac{\Delta E_i}{E_{iH}}\right) = E_R \tag{20}$$

From equations (19) and (20), it is seen that, when the level of the chrominance component corresponds to the level established by the chrominance reference signal $S_{VC}$, then the amplified chrominance reference signal level $E_{oV}$ produced by band-pass amplifier 1 is equal to the predetermined reference level $E_R$. Also, the amplified burst signal level $E_{oH}$ produced by the band-pass amplifier for the correct chrominance component level is equal to $E_{iH}/E_{iV} \times E_R$. The transfer functions of low-pass filters 48A and 48B, if designed in accordance with the graphical depiction shown in FIG. 7, will result in the aforementioned burst and chrominance reference signal levels when the correct level of the chrominance component is attained. That is, this design of the low-pass filters results in a correct color saturation characteristic which is centered about the normal flesh tones in the ultimately reproduced color video picture. Both the ACC circuit branch 10A and the VIR control branch 10B function to provide a proper color saturation level, notwithstanding transmission disturbances and other factors which may affect the level of the received chrominance component.

Let it now be assumed that the received composite color video signal does not include a VIR signal. Hence, VIR detector 56 will detect the absence of a VIR signal so as to condition switching circuit 55 to the state whereby burst gate signals $P_B$ are coupled to sample-and-hold circuit 47B. This means that sample-and-hold circuits 47A and 47B will be energized simultaneously to sample the difference between burst signal level $E_{oH}$ and reference level $E_R$. This, of course, means that $\Delta E_i$ (FIG. 8B) is equal to zero. Hence, equation (14) may be rewritten as:

$$E_{oH} = \frac{ME_R[F_H(s) + F_V(s)]}{1 + M[F_H(s) + F_V(s)]E_{iH}} E_{iH} \tag{21}$$

Similarly, equation (15) would be rewritten as equation (21) above. This means that level control circuit 10, in the absence of a VIR signal, operates as a conventional ACC circuit having a compound low-pass filter whose transfer function is equal to $[F_H(s)+F_V(s)]$. When proper color saturation is attained, the burst signal level $E_{oH}(0)$ is, from equation (21) expressed as:

$$E_{oH}(0) \approx E_R \tag{22}$$

Equation (22) also can be derived from equation (19) wherein, it is appreciated, $\Delta E_i$ equals zero. A comparison of equations (20) and (22) indicates that the level of the amplified burst signal $E_{oH}(0)$ is controlled, in the absence of a VIR signal, to be equal to the same level as the amplified chrominance reference signal $E_{oV}(0)$ when a VIR signal is present. Thus, level control circuit 10, although using a single, common amplifier 13, functions as a conventional ACC circuit in the absence of a VIR signal and, furthermore, functions as a VIR-controlled color saturation correction circuit when a VIR signal is present.

Turning now to phase control circuit 20, the transfer functions of low-pass filters 61A and 61B are designed to be analogous to the aforedescribed transfer functions of low-pass filters 48A and 48B, respectively. Hence, the frequency characteristics of low-pass filters 61A and 61B may correspond to the graphical depictions shown in FIG. 7. Thus, equations (1)–(4) are equally applicable to the low-pass filters included in phase control circuit 20.

Let it be assumed that the phase of burst signal $S_B$ which is transmitted through gate 11 to phase detector 22 is represented as $\theta_{iH}$; and that the phase of the chrominance reference signal $S_{VC}$ likewise is represented by $\theta_{iV}$. If the phase of the local oscillating signal generated by oscillator 21 is represented as $\theta_o$, then phase detector 22 produces a phase detected signal $V_{dH}$ which is proportional to the difference between the burst signal phase $\theta_{iH}$ and the local oscillating phase $\theta_o$; and also a phase detected signal $V_{dV}$ which is proportional to the difference between the phase of the chrominance reference signal $\theta_{iV}$ and the phase of the local oscillating signal $\theta_o$. If the gain of phase detector 22 is represented as K, then the phase detected signals $V_{dH}$ and $V_{dV}$ may be expressed as:

$$V_{dH} = K[\theta_{iH} - \theta_o] \tag{23}$$

$$V_{dV} = K[\theta_{iV} - \theta_o] \tag{24}$$

Sample-and-hold circuit 60A is responsive to burst gate signals $P_B$ to sample and store the phase detected signal $V_{dH}$. Similarly, sample-and-hold circuit 60B is responsive to the VIR gate signals $G_1$ to sample and store the phase detected signal $V_{dV}$. Phase detected signal $V_{dH}$ is transmitted through low-pass filter 61A to produce the burst-derived phase control component $V'_H$, represented as:

$$V'_H = F_H(s) V_{dH} \tag{25}$$

The phase detected signal $V_{dV}$ is transmitted through low-pass filter 61B to produce the VIR-derived phase component $V'_V$ as follows:

$$V'_V = F_V(s) V_{dV} \tag{26}$$

These phase control components are added in summing circuit 62 to produce phase control signal $V'_c$ as follows:

$$V'_c = V'_H + V'_V \tag{27}$$

Since oscillator 21 is a voltage controlled oscillator, the phase $\theta_o$ of its output oscillating signal varies, in time, as a function of phase control signal $V'_c$. This may be expressed as:

$$d\theta_o/dt = K_o V'_c \tag{28}$$

where $K_o$ is a constant of oscillating circuit 21 which is dimensioned as radian/sec/volt.

The Laplace transform of equation (28) is as follows:

$$\theta_o = K_o V'_c / s \tag{29}$$

From equations (23)–(29), the Laplace expression for the phase $\theta_o$ of the local oscillating signal is determined as:

$$\theta_o = K_o K \frac{F_H(s)\theta_{iH} + F_V(s)\theta_{iV}}{s + K_o K[F_H(s) + F_V(s)]} = \tag{30}$$
$$\frac{K_o K F_H(s)}{s + K_o K[F_H(s) + F_V(s)]} \theta_{iH} +$$
$$\frac{K_o K F_V(s)}{s + K_o K[F_H(s) + F_V(s)]} \theta_{iV}$$

It is assumed that the difference between the phase $\theta_{iH}$ of the burst signal and the phase $\theta_{iV}$ of the chrominance reference signal is equal to $\Delta\theta_i$. This appears as a corresponding difference $\Delta V_i$ in the levels of the phase detected signals $V_{dH}$ and $V_{dV}$, as shown in FIG. 8C. Hence, the expression for the phase of the chrominance reference signal may be expressed as:

$$\theta_{iV} = \theta_{iH} + \Delta\theta_i \tag{31}$$

Now, if equation (31) is substituted into equation (30), the following is obtained:

$$\theta_o = \frac{K_o K[F_H(s) + F_V(s)]}{s + K_o K[F_H(s) + F_V(s)]} \theta_{iH} + \tag{32}$$
$$\frac{K_o K F_V(s)}{s + K_o K[F_H(s) + F_V(s)]} \Delta\theta_i$$

The first term of equation (32) represents the response of phase control circuit 20 to the phase $\theta_{iH}$ of the burst signal. The second term of equation (32) represents the response of this phase control circuit to the difference signal $\Delta\theta_i$, which corresponds to a differential phase distortion between the burst and chrominance reference signals due to, for example, transmission disturbances or other factors. Also, the first term of equation (32) represents the response of a conventional APC circuit having a filter with a compound transfer function expressed as $[F_H(s) + F_V(s)]$.

When the hue of the ultimately reproduced video picture is correct, then the phase of the local oscillating signal generated by oscillator 21 may be represented as $\theta_o(0)$. Accordingly, equation (32) can be rewritten as s approaches zero as follows:

$$\theta_o(0) = \lim_{s \to 0} \theta_o = \theta_{iH} + \frac{F_V(0)}{F_H(0) + F_V(0)} \Delta\theta_i \tag{33}$$

When equation (3) is considered, the term $F_H(0)$ can be neglected. Hence, equation (33) may be rewritten as:

$$\theta_o(0) = \theta_{iH} + \Delta\theta_i = \theta_{iV} \tag{34}$$

From equation (34) it is observed that the phase $\theta_o$ of the local oscillating signal is controlled to be locked to the phase $\theta_{iV}$ of the chrominance reference signal $S_{VC}$. Hence, the hue of the ultimately reproduced video picture will be corrected to exhibit the proper flesh tones.

In the absence of a VIR signal, burst gate signals $P_B$ are supplied to both sample-and-hold circuits 60A and 60B. This means that phase control circuit 20 operates as a conventional APC circuit. That is, in the absence of a VIR signal, the differential phase component $\Delta\theta_i$ is equal to zero. When this condition is substituted into equation (32), the resultant equation appears as:

$$\theta_o = \frac{K_o K[F_H(s) + F_V(s)]}{s + K_o K[F_H(s) + F_V(s)]} \theta_{iH} \tag{35}$$

When the phase of the local oscillating signal is properly locked, this phase may be expressed as $\theta_o(0)$. That is, equation (35) may be rewritten as s approaches zero as follows:

$$\theta_o(0) = \lim_{s \to 0} \theta_o = \theta_{iH} \tag{36}$$

Thus, in the absence of a VIR signal, it is seen that the phase of the local oscillating signal is locked to the phase of the burst signal. Equation (35) represents the function of a typical APC circuit which includes a compound filter whose transfer function is equal to $[F_H(s) + F_V(s)]$.

In the embodiment shown in FIG. 5, the low-pass filters included in the respective branch circuits of level control circuit 10 and phase control circuit 20 have been designed with different frequency characteristics, as noted above and as depicted in FIG. 7. This facilitates the use of parallel ACC and VIR-controlled level correction loops as well as parallel APC and VIR-controlled phase correction loops. However, the present invention need not be limited solely to the use of such low-pass filters in these respective parallel loops. Rather, the advantages achieved by this invention, for example, the use of a common amplifier for level control and a common amplifier for phase control, as well as a relatively simplified circuit construction can be attained even if the respective low-pass filters are designed independently of each other and not necessarily in accordance with the graphical characteristics depicted in FIG. 7. Another embodiment of the present invention thus is shown in FIG. 9 and those component parts which are identical to the elements described in FIG. 5 are identified by like reference numerals.

The embodiment of FIG. 9 differs from the previously described embodiment of FIG. 5 in that a switching circuit 55 controlled by a VIR detector 56 need not be provided. Hence, VIR gate pulses $G_1$ always are supplied through OR circuit 52 to gate circuit 11 and, additionally, to sample-and-hold circuits 47B and 60B, even in the absence of a VIR signal. Furthermore, although the low-pass filters shown in FIG. 9 are connected in a manner similar to the embodiment shown in FIG. 5, these low-pass filters are identified with a prime added to the reference numeral to indicate the construction of such low-pass filters in FIG. 9 need not be identical to the construction of the low-pass filters shown in FIG. 5. In fact, and as will be described below, the low-pass filters 48′A, 48′B, 61′A and 61′B may be simple RC circuits. A further difference between the embodiment shown in FIG. 9 and the aforedescribed embodiment of FIG. 5 is that the combining circuits which had been described as summing circuits 49 and 62 now are replaced by the combination of a switching circuit 91 and a matrix circuit 92, and by the combination of a switching circuit 93 and a matrix circuit 94, respectively. Nevertheless, in FIG. 9, level control circuit 10 is formed of branch circuits 10A and 10B, corresponding to an ACC branch and a VIR-controlled level correction branch; and phase control circuit 20 is formed of separate branch circuits 20A and 20B corresponding to an APC branch and to a VIR-controlled hue correction branch. In FIG. 9, level comparator 46 and phase detector 22 function in the manner described previously with respect to the embodiment of FIG. 5.

In the embodiment shown in FIG. 9, the output of low-pass filter 48′A is coupled to one input of switching circuit 91 and, in addition, to one input of matrix circuit 92. The output of low-pass filter 48′B is coupled to another input of matrix circuit 92 whereat the burst-derived level control signal and the VIR-derived level control signal are matrixed together, the resultant matrixed signal being supplied to another input of switching circuit 91. Burst gate signals $P_B$ are supplied to switching circuit 91 to condition this switching circuit to one state wherein the output of low-pass filter 48′A is supplied through amplifier 13 to band-pass amplifier 1, and to another state for coupling the output of matrix circuit 92 through amplifier 13 to the band-pass amplifier. Switching circuit 91 is designed so as to normally admit of the state wherein the output of matrix circuit 92 normally is supplied to band-pass amplifier 1 and, when a burst gate signal is produced, the switching circuit is changed over to supply the output of low-pass filter 48′A to the band-pass amplifier for the duration of the burst gate signal.

In phase control circuit 20, switching circuit 93 is similar to switching circuit 91 in that one input thereof is coupled to the output of low-pass filter 61′A and the other input thereof is coupled to the output of matrix circuit 94. Matrix circuit 94 is connected to the outputs of low-pass filters 61′A and 61′B so as to matrix together the burst-derived and VIR-derived phase control components and to supply the matrixed signal to switching circuit 93. This switching circuit is conditioned to admit of its normal state whereby the output of matrix circuit 94 normally is supplied through amplifier 24 to oscillator 21, and is responsive to a burst gate signal $P_B$ to change over to its other state so as to couple the output of low-pass filter 61′A to the oscillator for the duration of the burst gate signal.

Figure 10:
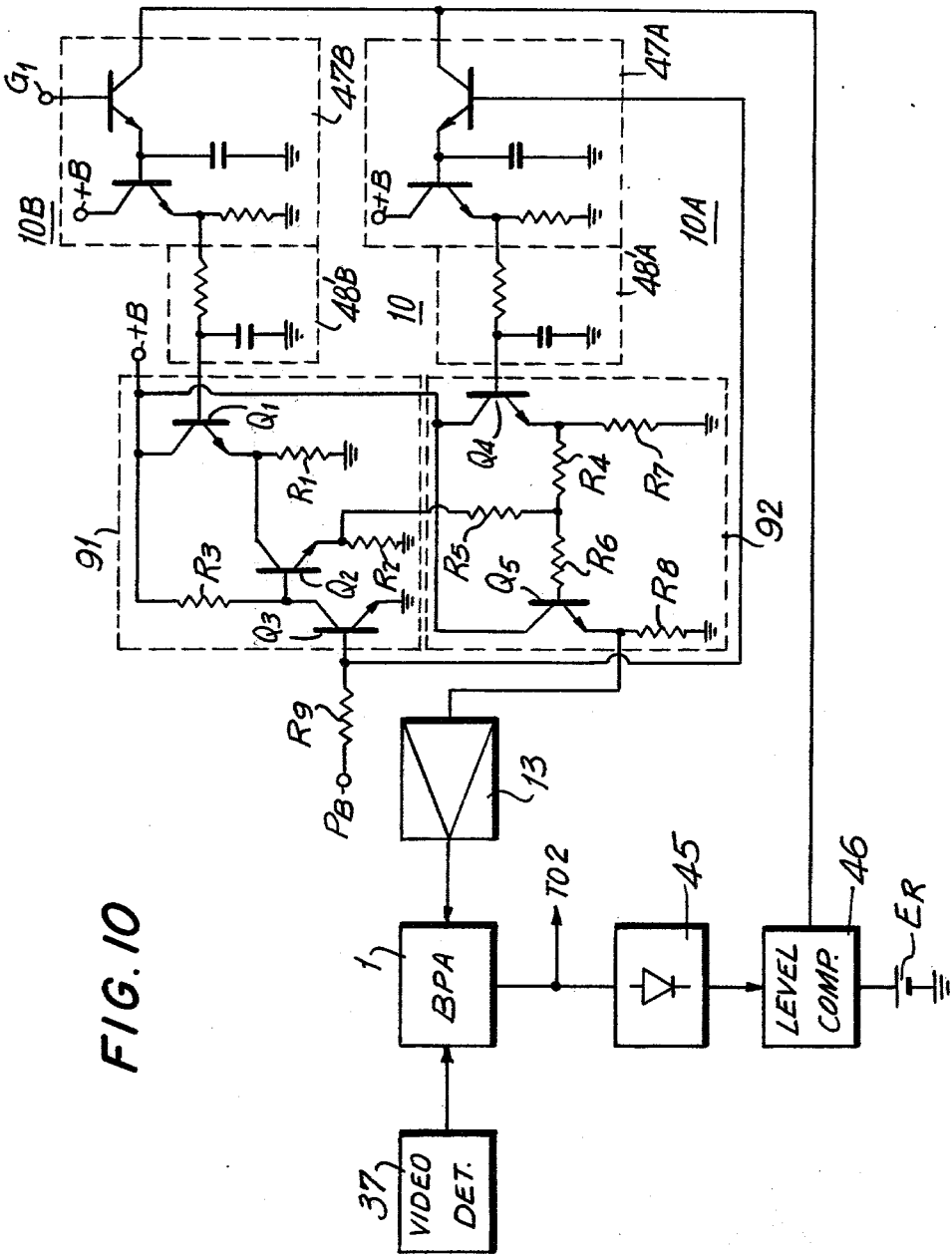
FIG. 10 is a partial block, partial schematic diagram showing a portion of the elements included in the embodiment of FIG. 9.

An example of the circuit construction of, for example, sample-and-hold circuits 47A and 47B, low-pass filters 48′A and 48′B, switching circuit 91 and matrix circuit 92 are shown in FIG. 10. Although not shown herein, it should be appreciated that the circuit construction of phase control circuit 20 may be substantially identical to the schematic representation of FIG. 10. Each of the sample-and-hold circuits is illustrated as a switching transistor whose collector-emitter circuit is connected in series with the output of level comparator 46, the respective transistors being rendered conductive in response to a burst gate signal $P_B$ or a VIR gate signal $G_1$, respectively. When the corresponding transistor is rendered conductive, the output of level comparator 46 charges an associated storage capacitor. The charge across this storage capacitor is coupled through an emitter-follower to a respective low-pass filter 48′A or 48′B. As shown in FIG. 10, these low-pass filters may be formed simply as RC circuits.

The schematic circuit representation shown in FIG. 10 differs somewhat from the block diagram shown in FIG. 9. That is, the output of low-pass filter 48′B is shown in FIG. 10 as being connected via an emitter-follower formed of transistor $Q_1$ having an emitter resistor $R_1$ to switching circuit 91, while the output of low-pass filter 48′A in FIG. 10 is shown as being connected through an emitter-follower transistor $Q_4$, having an emitter resistor $R_7$ to matrix circuit 92. Notwithstanding these circuit differences, the block diagram of FIG. 9 is the equivalent of the circuit construction shown in FIG. 10. Switching circuit 91 includes transistors $Q_2$ and $Q_3$ which are rendered conductive selectively in response to a received burst gate signal $P_B$. In particular, the collector-emitter circuit of transistor $Q_2$ is connected between the emitter of transistor $Q_1$ and a resistor $R_5$ included in matrix circuit 92. Transistor $Q_2$ additionally includes an emitter resistor $R_2$. Transistor $Q_3$ has its collector electrode connected to the base electrode of transistor $Q_2$ and, additionally, to a collector load resistor $R_3$ to a source of operating potential +B. The base electrode of transistor $Q_3$ is supplied with burst gate signals $P_B$ via resistor $R_9$.

The emitter of transistor $Q_4$ is coupled via a matrix resistor $R_4$ to a junction defined by the common connection of resistors $R_4$, $R_5$ and a base resistor $R_6$. Base resistor $R_6$ is connected to the base electrode of an emitter-follower transistor $Q_5$, having an emitter resistor $R_8$, whose emitter electrode is connected to common amplifier 13.

In operation, when burst gate signal $P_B$ is present, transistor $Q_3$ is rendered conductive thereby, resulting in a relatively low potential applied from the collector electrode of this transistor to the base electrode of transistor $Q_2$. Hence, transistor $Q_2$ is non-conductive so as to prevent the VIR-derived control component produced at the output of low-pass filter 48′B and appearing at the emitter electrode of emitter-follower transistor $Q_1$ from being applied to resistor $R_5$ of matrix circuit 92. Only the burst-derived control component produced at the output of low-pass filter 48′A is supplied to emitter-follower transistor $Q_4$ and, through resistors $R_4$ and $R_6$, through emitter-follower transistor $Q_5$ to amplifier 13. Hence, in the presence of the burst gate signal $P_B$, only the burst-derived level control component is supplied from low-pass filter 48′A through amplifier 13 to band-pass amplifier 1.

At the termination of the burst gate signal $P_B$, transistor $Q_3$ is rendered non-conductive until the occurrence of the next burst gate signal. While transistor $Q_3$ is non-conductive, the collector electrode thereof is provided with a relatively high potential so as to rendered transistor $Q_2$ conductive. Hence, the VIR-derived control component produced at the output of low-pass filter 48′B is supplied through emitter-follower transistor $Q_1$ and through the conductive collector-emitter circuit of transistor $Q_2$ to resistor $R_5$ in matrix circuit 92. At the same time, the burst-derived control component produced at the output of low-pass filter 48'A is supplied through emitter-follower transistor $Q_4$ to resistor $R_4$ in the matrix circuit. Hence, resistors $R_4$ and $R_5$ matrix the burst-derived control component and the VIR-derived control component to produce a control signal $V_c$ which is supplied through emitter-follower transistor $Q_5$ to amplifier 13 and thence to band-pass amplifier 1. It is, therefore, appreciated that when the burst signal $S_B$ is present, switching circuit 91 and matrix circuit 92 supply only the burst-derived level control component to amplifier 13. Thus, level control circuit 10 functions as a conventional ACC circuit. In the absence of the burst signal, that is, during the remainder of each horizontal line interval, and particularly the horizontal line interval in which the VIR signal is provided, switching circuit 91 and matrix circuit 92 function to matrix the burst-derived and VIR-derived control components into a combined control signal which is supplied to amplifier 13. Accordingly, level control circuit 10 here functions as a VIR-controlled color saturation correction circuit. Stated otherwise, during the burst signal interval, the gain of the chrominance component is controlled in accordance with the level of the received burst signal, and during all other intervals, the gain of the chrominance component is controlled in accordance with the received VIR signal.

If the composite color video signal does not include a VIR signal, then no signal information is present during the nineteenth line interval. Hence, the signal stored across the capacitor of sample-and-hold circuit 47B in response to the VIR gate signal $G_1$ is equal to zero. This means that a zero signal is provided at the output of emitter-follower transistor $Q_1$. Hence, the only signal information which is supplied to amplifier 13 to control band-pass amplifier 1 is derived from low-pass filter 48'A, through emitter-follower transistor $Q_4$, resistors $R_4$ and $R_6$ and emitter-follower transistor $Q_5$. This means that, in the absence of a VIR signal, level control circuit 10 functions merely as an ACC circuit.

Phase control circuit 20, shown in FIG. 9, may be of a circuit configuration which is substantially similar to that shown in FIG. 10. Hence, if a VIR signal is present, then the burst-derived phase control component and the VIR-derived phase control component are combined in matrix circuit 94 to form a phase control signal which is applied through amplifier 24 to oscillator 21. This control signal normally is applied except during the burst signal interval, whereby the VIR-derived phase control signal is prevented from being supplied through matrix circuit 94 and amplifier 24, thus leaving only the burst-derived phase control signal for use in controlling the phase of the local oscillating signal. That is, during the burst signal interval, phase control circuit 20 operates merely as an APC circuit; and during all other intervals, the phase control circuit operates as a VIR-controlled hue correction circuit. Furthermore, in the absence of a VIR signal, a zero signal is supplied from low-pass filter 61'B to matrix circuit 94. Consequently, only the burst-derived phase control signal is transmitted through the matrix circuit to amplifier 24 and oscillator 21. In the absence of a VIR signal, phase control circuit 20 operates merely as a typical APC circuit.

Since, in control circuits 10 and 20 shown in FIG. 9, matrix circuits 92 and 94, respectively, are connected between the low-pass filters and the respective common amplifiers 13 and 24, the low-pass filters need not be interdependent upon each other with the particular characteristics represented in FIG. 7. That is, the low-pass filters may be designed substantially independently of each other.

While the present invention has been particularly shown and described with reference to certain preferred embodiments, it should be readily apparent to those of ordinary skill in the art that various changes and modifications in form and details may be made without departing from the spirit and scope of the invention. For example, the VIR detector shown in FIG. 5 need not be operable merely to detect the level of the separated luminance signal Y. Rather, the VIR detector may detect the level of the chrominance reference signal $S_{VC}$ or a particular one or more of the demodulated color difference signals for the purpose of determining whether a VIR signal is present. Furthermore, in FIGS. 5 and 9, gate circuit 11, phase detector 22 and rectifier 45 can be omitted if color difference signals R-Y and B-Y, produced by demodulator 3 and representing phase and level errors, are used to control phase and gain characteristics, respectively. In that event, burst gate signals $P_B$ and VIR gate pulses $G_1$ are utilized to inactivate level control circuit 2 and phase shifter 25 while coupling color difference signal B-Y to level comparator 46 and coupling color difference signal R-Y to sample-and-hold circuits 60A and 60B. As a further modification of this embodiment, level control circuit 2 can be eliminated and reference level $E_R$ may be adjustable in accordance with the viewer's preferences. Still other variations will become apparent. It is, therefore, intended that the appended claims be interpreted as covering these as well as all other obvious changes and modifications.

What is claimed is:

1. In color video signal receiving apparatus of the type capable of receiving a color video signal including a VIR signal therein, color control apparatus comprising:
   a chrominance channel for processing the chrominance component included in said color video signal, said chrominance component including a burst signal and, if said VIR signal is present, a VIR reference component;
   extracting means coupled to said chrominance channel for separating said burst signal and said VIR reference component from said color video signal;
   means for detecting a predetermined parameter in said separated burst signal;
   means for detecting a corresponding parameter in said VIR reference component if said VIR signal is present;
   a common amplifier connected to said respective detecting means for producing an amplified control signal in response to said detected parameters; and
   adjustable means responsive to said amplified control signal for adjusting a color characteristic of the processed chrominance component.

2. The apparatus of claim 1 further comprising combining means coupled to said respective detecting means for producing a control signal as a function of the detected parameters in said separated burst signal and said separated VIR reference component and for supplying said control signal to said common amplifier.

3. The apparatus of claim 2 wherein said detecting means includes first filter means for filtering said detected parameter in said separated burst signal and for supplying the filtered detected parameter to said combining means; and second filter means for filtering said detected parameter in said VIR reference component and for supplying the last-mentioned filtered detected parameter to said combining means.

4. The apparatus of claim 3 further comprising gate signal generating means responsive to said color video signal for generating a burst gate signal substantially coincident with said burst signal and a VIR gate signal substantially coincident with said VIR reference component; and wherein said extracting means comprises gate means responsive to said burst and VIR gate signals for separating said burst signal and said VIR reference component from said color video signal.

5. The apparatus of claim 4 wherein each said detecting means further comprises sampling means responsive to a respective burst or VIR gate signal for sampling the detected parameter in a respective one of said separated burst signal or said separated VIR reference component.

6. The apparatus of claim 5 wherein said first filter means comprises a first low-pass filter having a gain $\mu_{oH}$ and a cut-off frequency $f_{cH}$, where $f_{cH}$ is less than the rate at which said burst signal is recurrent; and second filter means comprises a second low-pass filter having a gain $\mu_{oV}$, where $\mu_{oV} >> \mu_{oH}$, and a cut-off frequency $f_{cV}$, where $f_{cV}$ is less than the rate at which said VIR signal is recurrent and where $f_{cV} << f_{cH}$; and wherein said combining means comprises an adding circuit having one input coupled to the output of said first low-pass filter, another input coupled to the output of said second low-pass filter, and an output coupled to the input of said common amplifier.

7. The apparatus of claim 6 further comprising VIR signal detecting means and switch means coupled to said gate signal generating means, said switch means being responsive to the detection of said VIR signal for supplying the burst gate signal to a first of said sampling means for sampling the detected parameter in said separated burst signal and for supplying the VIR gate signal to a second of said sampling means for sampling the detected parameter in said separated VIR reference component, and said switch means being responsive to the absence of a detected VIR signal for supplying the burst gate signal to both said first and second sampling means.

8. The apparatus of claim 7, wherein said color characteristic which is adjusted is the level of said chrominance component, and further comprising a level comparator supplied with said separated burst signal and said VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

9. The apparatus of claim 8, wherein said adjustable means comprises a gain-controlled amplifier responsive to said amplified control signal for amplifying said chrominance component.

10. The apparatus of claim 7, wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

11. The apparatus of claim 10, wherein said adjustable means comprises controllable oscillator means for generating said local oscillating signal, the phase of said local oscillating signal being controlled in accordance with the amplified control signal, thereby to control the hue characteristic of the demodulated color signals.

12. The apparatus of claim 6, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

13. The apparatus of claim 12, wherein said adjustable means comprises a gain-controlled amplifier responsive to said amplified control signal for amplifying said chrominance component.

14. The apparatus of claim 6, wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

15. The apparatus of claim 14, wherein said adjustable means comprises controllable oscillator means for generating said local oscillating signal, the phase of said local oscillating signal being controlled in accordance with said amplified control signal, thereby to control the hue characteristic of the demodulated color signals.

16. The apparatus of claim 5 wherein said combining means comprises matrix means coupled to a first of said sampling means for receiving the sampled, detected parameter in said separated burst signal, said matrix means being further coupled to a second of said sampling means for receiving the sampled, detected parameter in said separated VIR reference component for matrixing said sampled, detected parameters to form said control signal; and switching means responsive to said burst gate signal for supplying said sampled, detected parameter in said separated burst signal to the input of said common amplifier; said switching means normally supplying the output of said matrix means to said input of said common amplifier in the absence of said burst gate signal.

17. The apparatus of claim 16 wherein said matrix means comprises a first emitter-follower stage for receiving said sampled, detected parameter in said separated burst signal, a second emitter-follower stage for receiving said sampled, detected parameter in said separated VIR reference component, an output emitter-follower stage for supplying said control signal to said common amplifier; and first and second resistance means for connecting said first and second emitter-follower stages, respectively, to said output emitter-follower stage.

18. The apparatus of claim 17 wherein said switching means comprises a switching element for normally connecting said second emitter-follower stage through said second resistance means to said output emitter-follower stage and for interrupting said connection in response to a burst gate signal.

19. The apparatus of claim 18, wherein said color characteristic which is adjusted is the level of said chrominance component, and further comprising a level comparator supplied with said sepatated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

20. The apparatus of claim 19, wherein said adjustable means comprises a gain-controlled amplifier responsive to said amplified control signal for amplifying said chrominance component.

21. The apparatus of claim 18, wherein said color characteristic which is adjusted is the hue characteristic; and wherein said chrominance channel includes demodulating means for demodulating said chrominance component into color signals and means for supplying a local oscillating signal to said demodulating means with which said charominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

22. The apparatus of claim 21, wherein said adjustable means comprises controllable oscillator means for generating said local oscillating signal, the phase of said local oscillating signal being controlled in accordance with said amplified control signal, thereby to control the hue characteristic of the demodulated color signals.

23. The apparatus of claim 17, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

24. The apparatus of claim 23, wherein said adjustable means comprises a gain-controlled amplifier responsive to said amplified control signal for amplifying said chrominance component.

25. The apparatus of claim 17, wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

26. The apparatus of claim 25, wherein said adjustable means comprises controllable oscillator means for generating said local oscillating signal, the phase of said local oscillating signal being controlled in accordance with said amplified control signal, thereby to control the hue characteristic of the demodulated color signals.

27. The apparatus of claim 16, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said chrominance level, whereby said detected parameters are the levels of the respective burst signal and VIR reference component.

28. The apparatus of claim 27, wherein said adjustable means comprises a gain-controlled amplifier responsive to said amplified control signal for amplifying said chrominance component.

29. The apparatus of claim 16, wherein said color characteristic which is adjusted is the hue characteristic; and wherein said chrominnace channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

30. The apparatus of claim 29, wherein said adjustable means comprises controllable oscillator means for generating said local oscillating signal, the phase of said local oscillating signal being controlled in accordance with the amplified control signal, thereby to control the hue characteristic of the demodulated color signals.

31. The apparatus of claim 5, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

32. The apparatus of claim 31 wherein said adjustable means comprises a gain-controlled amplifier responsive to said amplified control signal for amplifying said chrominance component.

33. The apparatus of claim 5, wherein said color characteristic which is adjusted is to hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

34. The apparatus of claim 33, wherein said adjustable means comprises controllable oscillator means for generating said local oscillating signal, the phase of said local oscillating signal being controlled in accordance with said amplified control signal, thereby to control the hue characteristic of the demodulated color signals.

35. The apparatus of claim 4, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

36. The apparatus of claim 35, wherein said adjustable means comprises a gain-controlled amplifier responsive to said amplified control signal for amplifying said chrominance component.

37. The apparatus of claim 4, wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

38. The apparatus of claim 37, wherein said adjustable means comprises controllable oscillator means for generating said local oscillating signal, the phase of said local oscillating signal being controlled in accordance with said amplified control signal, thereby to control the hue characteristic of the demodulated color signals.

39. The apparatus of claim 3, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

40. The apparatus of claim 39, wherein said adjustable means comprises a gain-controlled amplifier responsive to said amplified control signal for amplifying said chrominance component.

41. The apparatus of claim 3, wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

42. The apparatus of claim 41, wherein said adjustable means comprises controllable oscillator means for generating said local oscillating signal, the phase of said local oscillating signal being controlled in accordance with said amplified control signal, thereby to control the hue characteristic of the demodulated color signals.

43. The apparatus of claim 2, wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

44. The apparatus of claim 43, wherein said adjustable means comprises a gain-controlled amplifier responsive to said amplified control signal for amplifying said chrominance component.

45. The apparatus of claim 2, wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

46. The apparatus of claim 45, wherein said adjustable means comprises controllable oscillator means for generating said local oscillating signal, the phase of said local oscillating signal being controlled in accordance with said amplified control signal, thereby to control the hue characteristic of the demodulated color signals.

47. The apparatus of any of claim 1 wherein said color characteristic which is adjusted is the level of said chrominance component, and further comprising a level comparator supplied with said separated burst signal and said separated VIR reference component and also with a reference level for comparing said burst signal and said VIR reference component, respectively, to said reference level to detect a difference in the levels of said respective burst signal and VIR reference component from said reference level, whereby said detected parameters are the levels of the respective burst signal and VIR reference component.

48. The apparatus of claim 47 wherein said adjustable means comprises a gain-controlled amplifier responsive to said amplified control signal for amplifying said chrominance component.

49. The apparatus of any of claim 1 wherein said color characteristic which is adjusted is the hue characteristic; and wherein said chrominance channel includes demodulating means for demodulating said chrominance component into color signals and means for supplying a local oscillating signal to said demodulating means with which said chrominance component is demodulated; said apparatus further comprising phase comparator means supplied with said separated burst signal and said separated VIR reference component, and also with said local oscillating signal for comparing the phase of said local oscillating signal with the phase of said burst signal and said VIR reference component, respectively, to detect phase differences therebetween, whereby said detected parameters are the phase differences of the respective burst signal and VIR reference component from said local oscillating signal.

50. The apparatus of claim 49 wherein said adjustable means comprises controllable oscillator means for generating said local oscillating signal, the phase of said local oscillating signal being controlled in accordance with said amplified control signal, thereby to control the hue characteristic of the demodulated color signals.

51. In color video signal receiving apparatus capable of receiving a color video signal including a burst signal and a VIR signal having at least a chrominance reference signal therein, said color video signal receiving apparatus including a chrominance channel for transmitting a chrominance component thereover and having a demodulator for demodulating said chrominance component with a local oscillating signal, color control apparatus for controlling the saturation and hue characteristics of the demodulated chrominance component, comprising:
automatic chrominance control means responsive to the level of said burst signal included in said chrominance component for producing a first level-control signal component derived from the burst signal level;
color saturation control means responsive to the level of said chrominance reference signal included in said VIR signal for producing a second level-control signal component derived from the chrominance reference signal level;
a first common amplifier for receiving said first and second level-control signal components to produce an amplified level control signal;
gain adjustment means for receiving said chrominance component and responsive to said amplified level control signal to correspondingly adjust the level of said chrominance component;
automatic phase control means responsive to the phase of said burst signal relative to said local oscillating signal for producing a first phase control signal component;
hue control means responsive to the phase of said chrominance reference signal included in said VIR signal relative to said local oscillating signal for producing a second phase control signal component;
a second common amplifier for receiving said first and second phase control signal components to produce an amplified phase control signal; and
controllable oscillator means for generating said local oscillating signal and responsive to said amplified phase control signal to correspondingly adjust the phase of said local oscillating signal.

52. The apparatus of claim 51 further comprising gate signal generating means responsive to said color video signal for generating a burst gate signal coincident with said burst signal and a VIR gate signal coincident with said chrominance reference signal; gate means coupled to said chrominance channel and responsive to said burst and VIR gate signals for separating said burst and chrominance reference signals, respectively, from said color video signal; level comparator means coupled to said gate means and supplied with a reference level for comparing said separated burst and chrominance reference signals thereto, the output of said level comparator means being coupled to said automatic chrominance control means and to said color saturation control means; and phase comparator means coupled to said gate means and supplied with said local oscillating signal for comparing the phases of said separated burst and chrominance reference signals thereto, the output of said phase comparator means being coupled to said automatic phase control means and to said hue control means.

53. The apparatus of claim 52 wherein said automatic chrominance control means includes first sampling means responsive to said burst gate signal for sampling the output of said level comparator means; said color saturation control means includes second sampling means responsive to said VIR gate signal for sampling the output of said level comparator means; said automatic phase control means includes third sampling means responsive to said burst gate signal for sampling the output of said phase comparator means; and said hue control means includes fourth sampling means responsive to said VIR gate signal for sampling the output of said phase comparator means.

54. The apparatus of claim 53 further comprising first low-pass filter means coupled to the output of said first sampling means having a gain $\mu_{oH}$ and a cut-off frequency $f_{cH}$; second low-pass filter means coupled to the output of said second sampling means having a gain $\mu_{oV}$ and a cut-off frequency $f_{cV}$; third low-pass filter means coupled to the output of said third sampling means having a gain $\mu_{oH}$ and a cut-off frequency $f_{cH}$; fourth low-pass filter means coupled to said fourth sampling means having a gain $\mu_{oV}$ and a cut-off frequency $f_{cV}$; wherein $\mu_{oV} > > \mu_{oH}$ and $f_{cH} > > f_{cV}$ and $f_{cH}$ is less than the repetition rate of said burst signal and $f_{cV}$ is less than the repetition rate of said VIR signal; first adding means coupled to said first and second low-pass filter means for receiving said first and second level-control signal components therefrom to add said level-control signal components and supply a summed level-control signal to said first common amplifier; and second adding means coupled to said third and fourth low-pass filter means for receiving said first and second phase control signal components therefrom to add said phase control signal components and supply a summed phase control signal to said second common amplifier.

55. The apparatus of claim 54 wherein said gate signal generating means includes switching means responsive to the absence of a VIR signal in said color video signal to supply said burst gate signal to said second and fourth sampling means in place of said VIR gate signal.

56. The apparatus of claim 53 further comprising first matrix means for receiving the outputs of said first and second sampling means and for matrixing the received outputs to form a level-control signal; second matrix means for receiving the outputs of said third and fourth sampling means and for matrixing the received outputs to form a phase control signal; first switch means normally supplying said level-control signal formed by said first matrix means to said first common amplifier and responsive to said burst gate signal for supplying the output of said first sampling means to said first common amplifier; and second switch means normally supplying said phase control signal formed by said second matrix means to said second common amplifier and responsive to said burst gate signal for supplying the output of said third sampling means to said third common amplifier.

57. In color video signal receiving apparatus capable of receiving a color video signal including a burst signal and a VIR signal, said color video signal receiving apparatus including a chrominance channel for transmitting a chrominance component thereover and having a demodulator for demodulating said chrominance component with a local oscillating signal, color control apparatus for controlling at least one of the saturation and hue characteristics of the demodulated chrominance component, comprising:
- means coupled to said chrominance channel for providing a signal having a level representing a corresponding one of said saturation and hue characteristics;
- first sampling means for sampling said signal level at the time that said burst signal is received;
- second sampling means for sampling said signal level at the time that said VIR signal is received;
- a common amplifier coupled to said first and second sampling means for amplifying the respective sampled signal levels; and
- adjustable means responsive to the amplified sampled signal levels for adjusting a corresponding one of the saturation and hue characteristics of said demodulated chrominance component.

58. The apparatus of claim 57 wherein said means for providing a signal comprises a level comparator supplied with a signal from said chrominance channel representing the gain of said chrominance channel and also supplied with a reference level for comparing the respectively supplied signal and reference level to each other so as to produce said signal level as a function of the difference therebetween; and said adjustable means comprises a gain-controlled amplifier responsive to said amplified sampled signal levels for amplifying said chrominance component.

59. The apparatus of claim 57 wherein the characteristic represented by the provided signal is the hue characteristic, and said adjustable means comprises controllable oscillator means for generating said local oscillating signal, the phase of said local oscillating signal being controlled in accordance with said amplified sampled signal levels to control the hue characteristic of the demodulated chrominance component.

* * * * *